US011425288B2

(12) United States Patent
Park

(10) Patent No.: US 11,425,288 B2
(45) Date of Patent: Aug. 23, 2022

(54) LENS ASSEMBLY AND CAMERA MODULE CAPABLE OF PERFORMING A ZOOM-UP FUNCTION

(71) Applicant: LG INNOTEK CO., LTD., Seoul (KR)

(72) Inventor: Sung June Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/961,830

(22) PCT Filed: Jan. 16, 2019

(86) PCT No.: PCT/KR2019/000627
§ 371 (c)(1),
(2) Date: Jul. 13, 2020

(87) PCT Pub. No.: WO2019/143116
PCT Pub. Date: Jul. 25, 2019

(65) Prior Publication Data
US 2021/0084201 A1   Mar. 18, 2021

(30) Foreign Application Priority Data

Jan. 17, 2018 (KR) .......................... 10-2018-0006059

(51) Int. Cl.
*H04N 5/225*   (2006.01)
*G02B 9/12*   (2006.01)
*G03B 5/00*   (2021.01)

(52) U.S. Cl.
CPC ............. *H04N 5/2253* (2013.01); *G02B 9/12* (2013.01); *G03B 5/00* (2013.01); *H04N 5/2254* (2013.01)

(58) Field of Classification Search
CPC ...... H04N 5/2253; H04N 5/2254; G02B 9/12; G02B 7/02; G02B 7/022; G02B 7/023; G03B 5/00; G03B 17/12; G03B 17/17; G03B 30/00; G03B 3/10; G03B 2205/0046; G03B 2205/0069
See application file for complete search history.

(56) References Cited

U.S. PATENT DOCUMENTS

| | | | | |
|---|---|---|---|---|
| 5,937,215 A * | 8/1999 | Mogamiya | ............... | G02B 7/10 396/85 |
| 6,252,628 B1 * | 6/2001 | Kobayashi | ............... | G02B 7/10 348/240.3 |
| 6,498,903 B2 * | 12/2002 | Omiya | ................... | G02B 7/102 396/175 |
| 7,817,353 B2 * | 10/2010 | Oh | ....................... | G02B 13/009 359/695 |
| 2007/0053672 A1 | 3/2007 | Westerweck et al. | | |

(Continued)

FOREIGN PATENT DOCUMENTS

| CN | 205453883 U | 8/2016 |
|---|---|---|
| CN | 107357026 A | 11/2017 |

(Continued)

*Primary Examiner* — Luong T Nguyen
(74) *Attorney, Agent, or Firm* — Birch, Stewart, Kolasch & Birch, LLP

(57) ABSTRACT

A lens assembly includes a base, a first lens group disposed in the base, a first body coupled to the first lens group, and a first wheel rotatably coupled to the first body, the first wheel being configured to move the first lens group on the base.

19 Claims, 9 Drawing Sheets

(56) References Cited

U.S. PATENT DOCUMENTS

| | | | |
|---|---|---|---|
| 2007/0154198 A1* | 7/2007 | Oh | G02B 13/009 |
| | | | 396/85 |
| 2007/0280667 A1* | 12/2007 | Shin | G03B 3/10 |
| | | | 396/133 |
| 2008/0024879 A1 | 1/2008 | Shih et al. | |
| 2008/0211955 A1* | 9/2008 | Avital | H04N 5/2254 |
| | | | 348/335 |
| 2011/0199675 A1 | 8/2011 | Henry | |
| 2013/0100538 A1 | 4/2013 | Kim | |
| 2014/0333829 A1 | 11/2014 | Lee et al. | |
| 2016/0044232 A1 | 2/2016 | Kim et al. | |

FOREIGN PATENT DOCUMENTS

| | | | |
|---|---|---|---|
| KR | 10-2013-0041283 A | | 4/2013 |
| KR | 10-2013-0042788 A | | 4/2013 |
| KR | 10-2014-0069803 A | | 6/2014 |
| KR | 10-2014-0132468 | * | 11/2014 |
| KR | 10-2014-0132468 A | | 11/2014 |
| KR | 10-2016-0019280 A | | 2/2016 |
| KR | 10-2016-0037732 A | | 4/2016 |
| KR | 10-2017-0005648 | * | 1/2017 |
| KR | 10-2017-0005648 A | | 1/2017 |
| WO | WO 2014/042440 A1 | | 3/2014 |
| WO | WO 2016/166730 A1 | | 10/2016 |

\* cited by examiner

【FIG. 1】
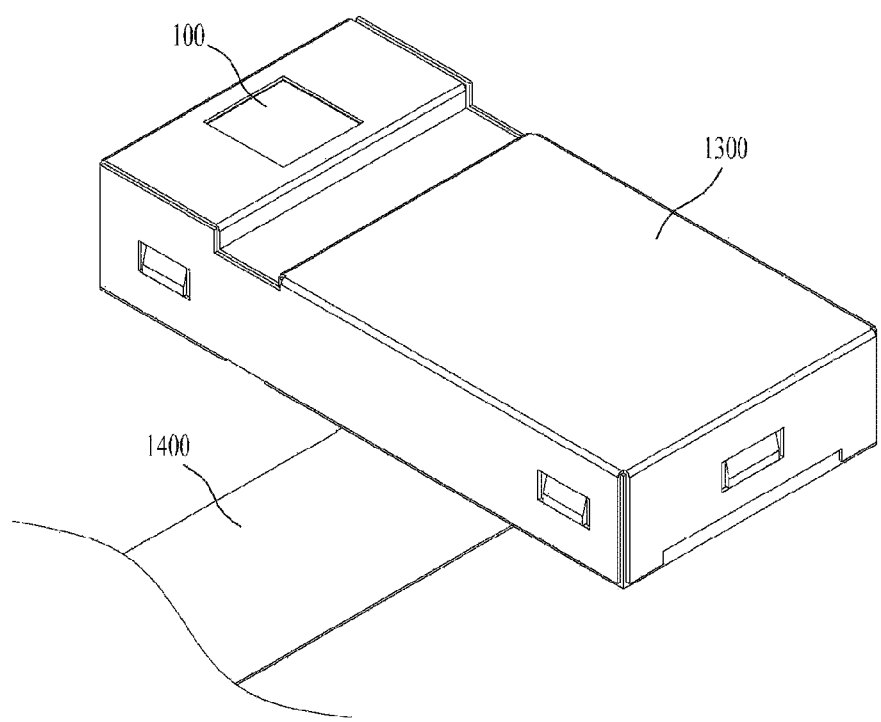
【FIG. 2】
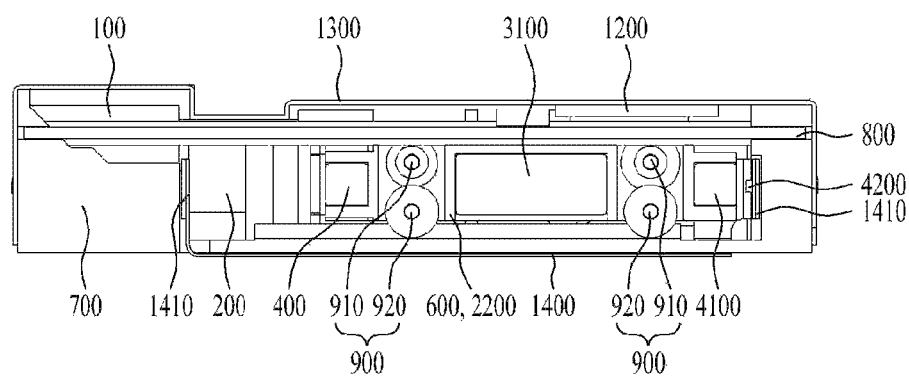

[FIG. 3]
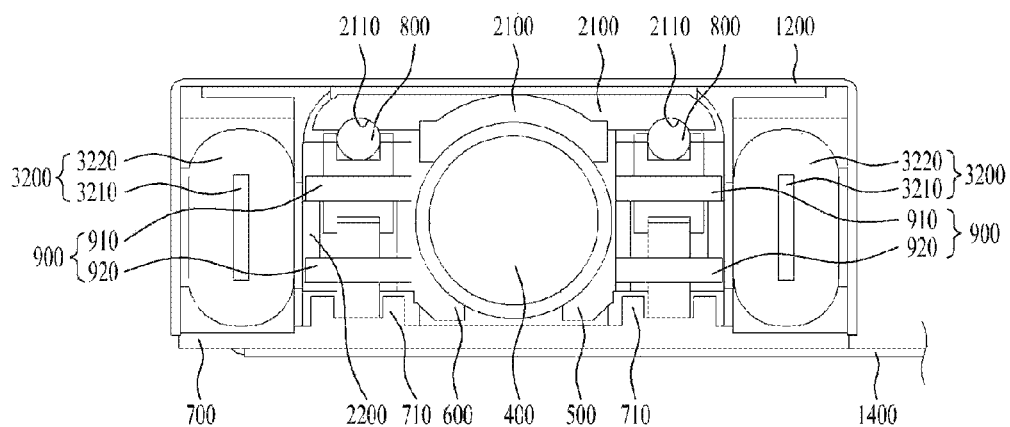
[FIG. 4]
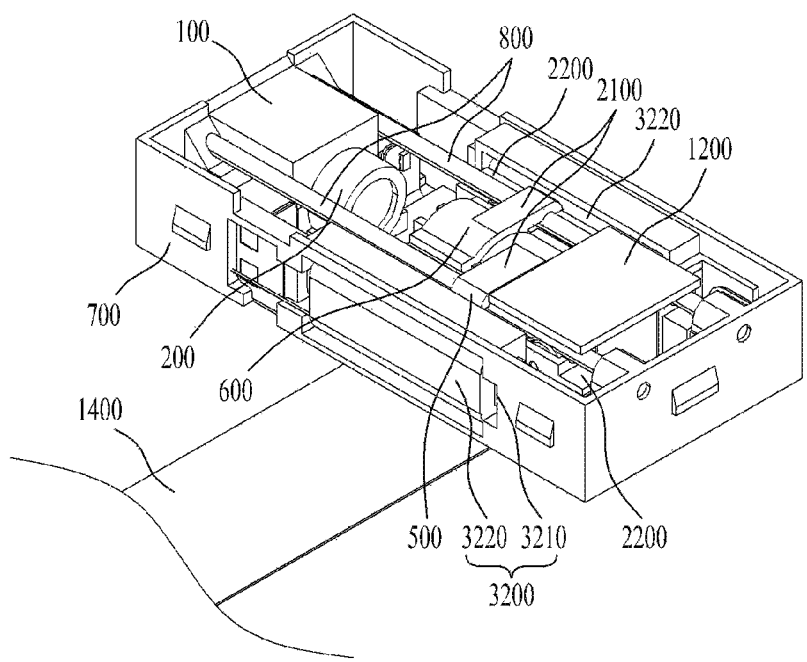

[FIG. 5]
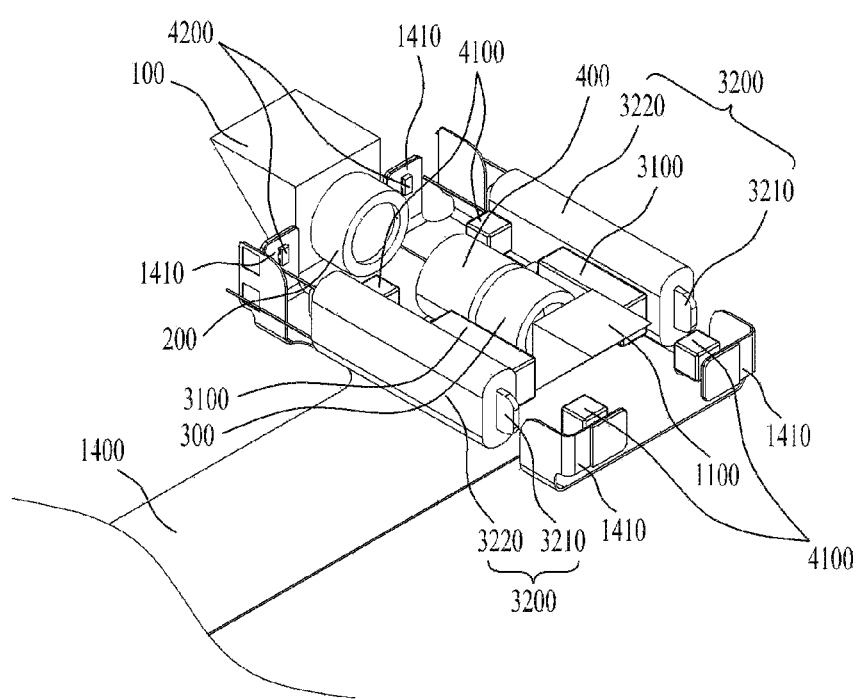

[FIG. 6]
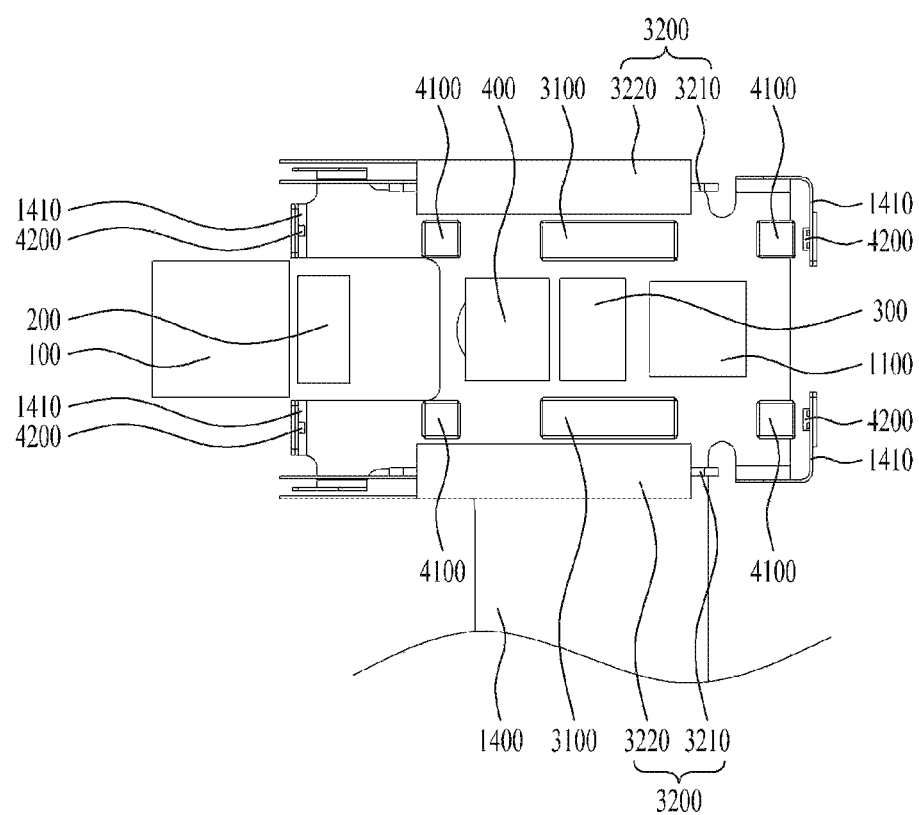

[FIG. 7]
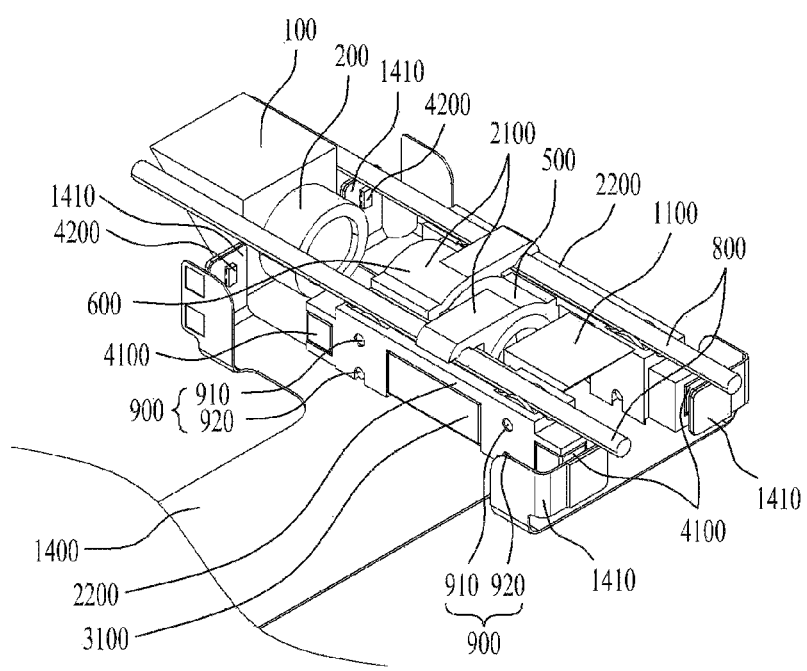

[FIG. 8]
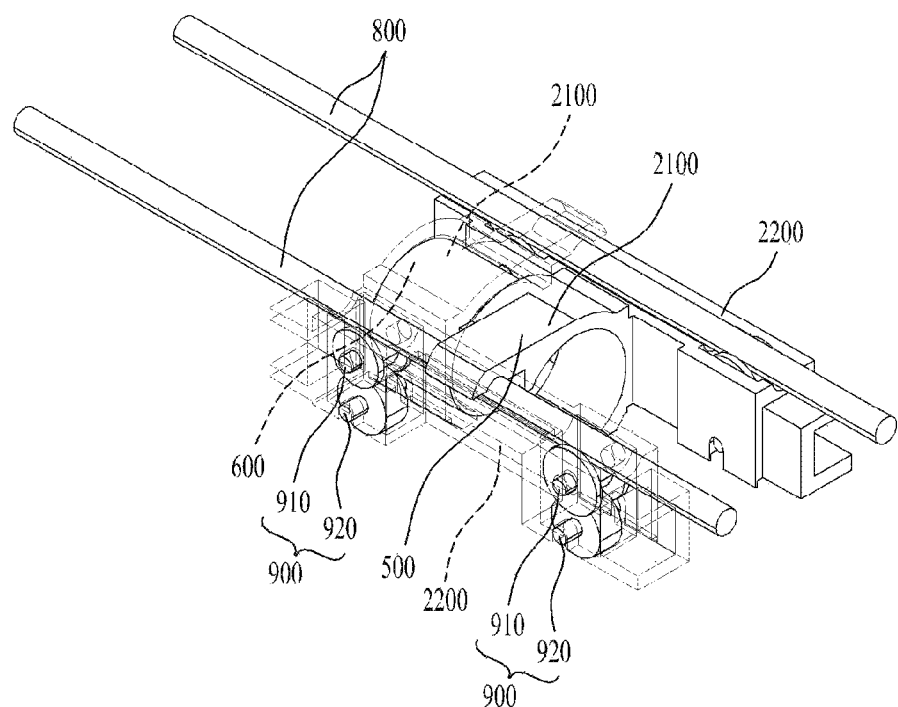

[FIG. 9]
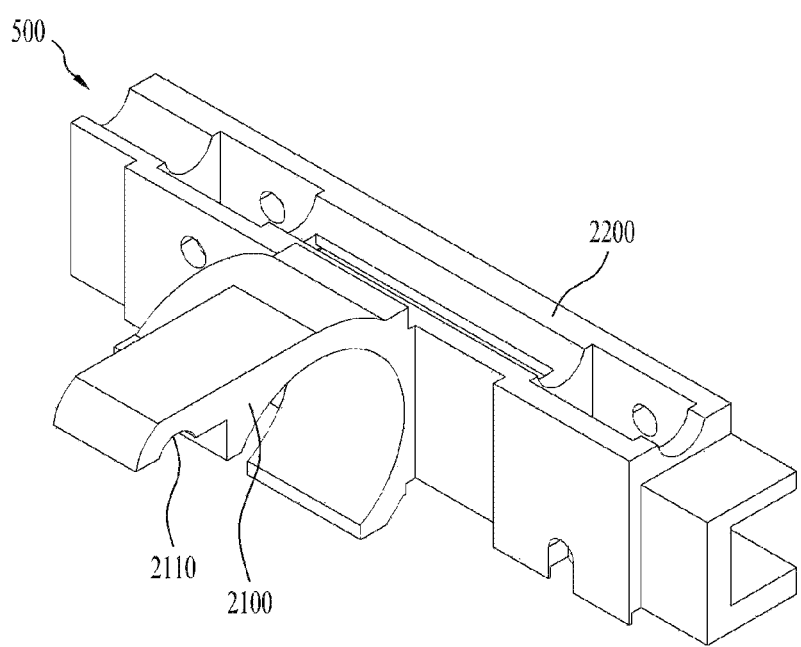

[FIG. 10]
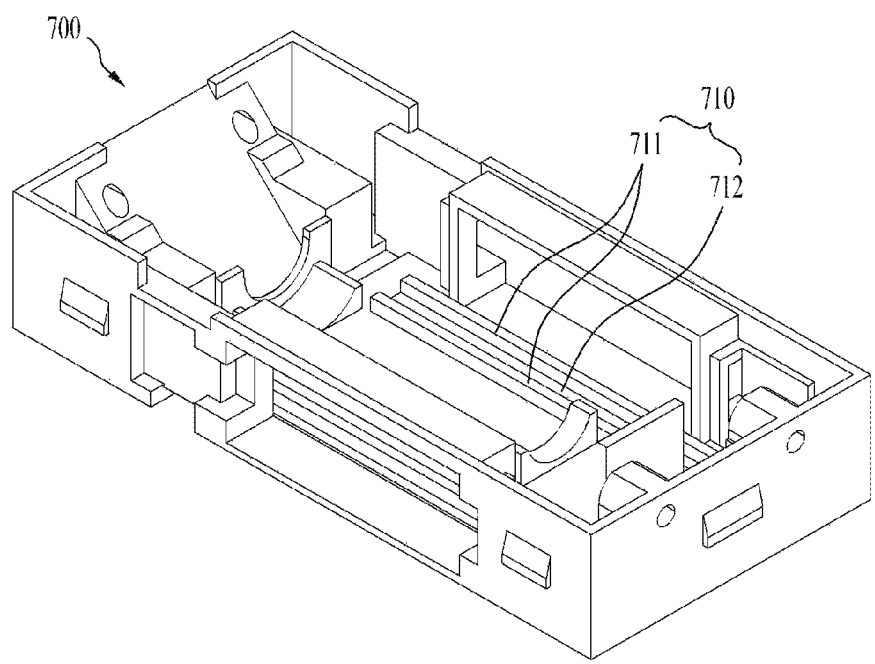

[FIG. 11]
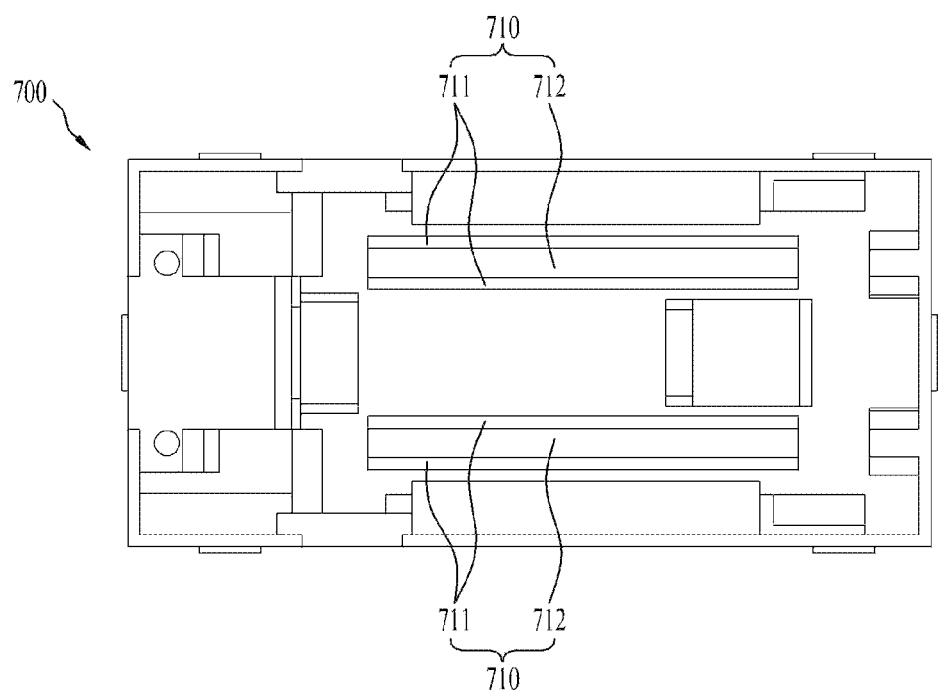

LENS ASSEMBLY AND CAMERA MODULE CAPABLE OF PERFORMING A ZOOM-UP FUNCTION

CROSS REFERENCE TO RELATED APPLICATIONS

This application is the National Phase of PCT International Application No. PCT/KR2019/000627, filed on Jan. 16, 2019, which claims priority under 35 U.S.C. 119(a) to Patent Application No. 10-2018-0006059, filed in the Republic of Korea on Jan. 17, 2018, all of which are hereby expressly incorporated by reference into the present application.

TECHNICAL FIELD

Embodiments relate to a lens assembly and a camera module including the same.

BACKGROUND ART

The content described in this section merely provides background information regarding embodiments, and does not constitute the conventional art.

Mobile phones or smartphones equipped with camera modules that take an image or a video of an object and store the same have been developed. In general, a camera module may include a lens, an image sensor module, and a lens-moving device for adjusting the distance between the lens and the image sensor module.

Mobile devices, such as mobile phones, smartphones, tablet PCs, and laptops, have built-in miniature camera modules. Camera modules may perform an auto-focusing function of adjusting the distance between an image sensor and a lens to control the focal length of the lens.

Meanwhile, camera modules may also perform a zoom-up function, i.e. a function of photographing an object located a long distance away with increased magnification.

Since miniature camera modules have a limited size, there is a problem in that it is difficult to construct miniature camera modules such that they perform a zoom-up function of the type implemented in general large-scale cameras.

DISCLOSURE

Technical Problem

Embodiments relate to a lens assembly and a camera module including the same, and further relate to a lens assembly capable of performing a zoom-up function and a camera module including the same.

The objects to be accomplished by the embodiments are not limited to the above-mentioned objects, and other objects not mentioned herein will be clearly understood by those skilled in the art from the following description.

Technical Solution

The present disclosure provides a lens assembly including a base, a first lens group disposed in the base, a first body coupled to the first lens group, and a first wheel rotatably coupled to the first body and configured to move the first lens group on the base.

The first body may include a first hole in which the first wheel is disposed.

The base may include a recess formed therein to receive a portion of the first wheel and to guide the first wheel.

The lens assembly may include a first magnet disposed in the first body and a first coil part disposed in the base so as to be opposite the first magnet.

The first coil part may include a yoke disposed in the base such that a long side thereof is parallel to an optical-axis direction, and a coil wound on the yoke and disposed opposite the first magnet.

The lens assembly may include a first sensing magnet and a second sensing magnet disposed in the first body, with the first magnet interposed therebetween, and a first position sensor disposed at a position corresponding to the first sensing magnet and a second position sensor disposed at a position corresponding to the second sensing magnet on the base.

The lens assembly may include a first rod disposed in the base and a second wheel coupled to the first body and configured to move the first body on the first rod.

The first wheel and the second wheel may be in contact with each other to roll.

The second wheel may include a groove in which a portion of the first wheel is disposed.

In addition, the present disclosure provides a lens assembly including a base, a first lens group disposed in the base, a first mover coupled to the first lens group and configured to move the first lens group, and a first rod disposed in the base. The first mover includes a first wheel configured to move the first lens group along the rod.

One surface of the first wheel, which is in contact with one surface of the first rod, may have a shape corresponding to the shape of the one surface of the rod.

In addition, the present disclosure provides a camera module including a base, a first lens group disposed in the base, a second lens group spaced apart from the first lens group in an optical-axis direction, a third lens group disposed between the first lens group and the second lens group, a first wheel configured to move the second lens group in the optical-axis direction on the base, and a second wheel configured to move the third lens group in the optical-axis direction on the base.

Advantageous Effects

In an embodiment, a body may be efficiently moved on a base in an optical-axis direction through rolling of a wheel.

In an embodiment, a third lens group and a second lens group may be sequentially provided behind a first lens group, and among the plurality of lens groups, the moving directions and the moving distances of at least two groups (e.g. the second lens group and the third lens group) may be independently adjusted by a first body and a second body, respectively. Thus, a camera module according to the embodiment may efficiently and accurately perform a zoom-up function.

DESCRIPTION OF DRAWINGS

FIG. 1 is a perspective view illustrating a camera module according to an embodiment.

FIG. 2 is a cross-sectional view of FIG. 1 when viewed from the side.

FIG. 3 is a cross-sectional view of FIG. 1 when viewed from the front.

FIG. 4 is a perspective view of FIG. 1, from which a cover is removed.

FIG. 5 is a perspective view of FIG. 4, from which some components are removed.

FIG. 6 is a plan view of FIG. 5.

FIG. 7 is a perspective view of FIG. 4, from which some components are removed.

FIG. 8 is a perspective view illustrating some components of a camera module according to an embodiment.

FIG. 9 is a perspective view illustrating a first body according to an embodiment.

FIG. 10 is a perspective view illustrating a base according to an embodiment.

FIG. 11 is a plan view of FIG. 10.

BEST MODE

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure covers all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used merely to describe the embodiments, and do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

In the description of the embodiments, the optical-axis direction is a direction that is the same as or parallel to the direction in which a first lens group 200 to a third lens group 400 are aligned.

FIG. 1 is a perspective view illustrating a camera module according to an embodiment. FIG. 2 is a cross-sectional view of FIG. 1 when viewed from the side. FIG. 3 is a cross-sectional view of FIG. 1 when viewed from the front. FIG. 4 is a perspective view of FIG. 1, from which a cover 1300 is removed. FIG. 5 is a perspective view of FIG. 4, from which some components are removed. FIG. 6 is a plan view of FIG. 5.

A lens assembly according to an embodiment may include at least one of first to third lens groups and at least one body in which at least one of the first to third lens groups is disposed. The lens assembly according to an embodiment may include a first lens group 200, a second lens group 300, a third lens group 400, a first body 500, a second body 600, a base 700, and a rolling part 900. In the present disclosure, the rolling part may be a wheel.

A lens assembly according to an embodiment may include a cover 1300, a first prism 100, a second prism 1100, an image sensor 1200, a first lens group 200, a second lens group 300, a third lens group 400, a first body 500, a second body 600, a base 700, a rod 800, and a rolling part 900. One or both of the first prism 100 and the second prism 1100 may be omitted.

A camera module may include a lens assembly, and may include an image sensor and a printed circuit board.

The cover 1300 may be coupled to the base 700, and may cover the components accommodated in the base 700 to thus protect the constituent components of the camera module. The cover 1300 may be coupled to the base 700 in a shape-fit manner and/or using an adhesive.

For example, a hook may be formed on the side surface of the base 700 so as to protrude therefrom, and the cover 1300 may include a hole formed at a position corresponding to the hook. The cover 1300 may be coupled to the base 700 through engagement of the hook of the base 700 into the hole in the cover 1300. In addition, the cover 1300 may be stably coupled to the base 700 using an adhesive.

The first prism 100 may be disposed in front of the first lens group 200, and may change the optical path of incident light. Referring to FIG. 5, external light may be incident on the first prism 100 in a direction perpendicular to the optical-axis direction, which is the direction in which the first lens group 200 to the third lens group 400 are aligned. The first prism 100 may be an optical member having a triangular column shape. Alternatively, the first prism 100 may be a reflector or a mirror, rather than a prism, and may include an optical member for transmitting external light incident thereon in the optical-axis direction of the first lens group 200 to the third lens group 400 in order to serve the same purpose as the prism.

The optical path of the external light incident on the first prism 100 may be changed by the first prism 100 so as to be oriented in the optical-axis direction, and thus, referring to FIG. 6, the light may sequentially pass through the first lens group 200, the third lens group 400, and the second lens group 300.

Referring to FIG. 5, the first prism 100 may have a total reflection surface, which is formed at a predetermined angle relative to the optical-axis direction. The external light incident on the first prism 100 may be reflected by the reflection surface, and the optical path thereof may be changed so as to be oriented in the optical-axis direction of the first lens group 200 to the third lens group 400. The first prism 100 may be omitted from the lens assembly or the camera module.

The second prism 1100 may be disposed adjacent to the second lens group 300, and may change the optical path of the light to be emitted. The light emitted from the first prism 100 may sequentially pass through the first lens group 200, the third lens group 400, and the second lens group 300, and may then be incident on the second prism 1100. The second prism 1100 may be omitted from the lens assembly or the camera module. Similar to the first prism 100, the second prism 1100 may be a reflector or a mirror, and may include an optical member in order to achieve the same purpose.

Referring to FIG. 5, the second prism 1100 may have a reflection surface, which is formed so as to be oriented in a diagonal direction relative to the optical-axis direction. The light incident on the second prism 1100 may be reflected by the reflection surface, and the optical path thereof may be changed from the optical-axis direction so as to be oriented in a direction perpendicular to the optical-axis direction.

The image sensor 1200 may be disposed opposite the light emission surface of the second prism 1100. Referring to FIGS. 4 and 5, the optical path of the light passing through the second prism 1100 may be changed so as to be oriented in a direction perpendicular to the optical-axis direction.

Therefore, the light emission surface of the second prism 1100 may be disposed so that the light travels in the upward direction of the camera module, and the image sensor 1200 may be disposed opposite the light emission surface in an upward-downward direction.

The light emitted from the light emission surface of the second prism 1100 may be incident on the image sensor 1200, and the image sensor 1200 may capture an image using the incident light. When the second prism 1100 is omitted, the image sensor 1200 may be disposed in the optical axis of the first lens group 200 to the third lens group 400.

In an embodiment, the distance between the first lens group 200, the third lens group 400, and the second lens group 300 may be adjusted in order to implement zoom-up with respect to an image captured by the camera module.

In an embodiment, zoom-up may be implemented by moving the second lens group 300 and the third lens group 400 in the optical-axis direction to adjust the distance between the first lens group 200 and the third lens group 400 and the distance between the third lens group 400 and the second lens group 300.

Each of the first lens group 200 to the third lens group 400 may be configured such that one or two or more lenses are aligned in the optical-axis direction to form an optical system and are mounted in a barrel.

The first lens group 200 may be disposed opposite the first prism 100, and the light emitted from the first prism 100 may be incident on the first lens group 200. The first prism 100 may be omitted. At least one of the first lens group 200 to the third lens group 400 may be securely mounted in the camera module so as not to be moved in the optical-axis direction.

Therefore, the base 700 may include a mounting portion to which the first lens group 200 is securely coupled. The first lens group 200 may be seated on the mounting portion, and may be secured to the mounting portion using an adhesive.

The second lens group 300 may be spaced apart from the first lens group 200 in the optical-axis direction, and may move in the optical-axis direction. The third lens group 400 may be disposed between the first lens group 200 and the second lens group 300, and may move in the optical-axis direction.

The light emitted from the second lens group 300 may be incident on the second prism 1100, disposed behind the second lens group 300, and the optical path of the light may be changed while the light passes through the second prism 1100. The light emitted from the second prism 1100 may be incident on the image sensor 1200.

As the second lens group 300 and the third lens group 400 move in the optical-axis direction, the distance between the first lens group 200 and the third lens group 400 and the distance between the third lens group 400 and the second lens groups 300 may be adjusted, whereby the camera module may implement zoom-up.

The first body 500 may be coupled to the second lens group 300 so as to move the second lens group 300 in the optical-axis direction. The first body 500 may include a lens-mounting part 2100 and a frame 2200.

The lens-mounting part 2100 may protrude from the frame 2200 in a direction perpendicular to the optical-axis direction, and at least one lens may be mounted thereto. The at least one lens mounted to the lens-mounting part 2100 may form the second lens group 300.

The frame 2200 may be disposed such that the longitudinal direction thereof is oriented in the optical-axis direction, and a driving magnet 3100 and a sensing magnet 4100 may be mounted thereto. The frame 2200 may be provided with the rolling part 900.

The frame 2200 may move in the optical-axis direction due to the electromagnetic interaction between the driving magnet 3100 and the coil part 3200, and accordingly, the lens-mounting part 2100 and the second lens group 300 mounted to the lens-mounting part 2100, may move in the optical-axis direction.

The second body 600 may be coupled to the third lens group 400 to move the third lens group 400 in the optical-axis direction. The second body 600 may have a structure substantially similar to that of the first body 500, except that a lens-mounting part 2100 thereof is disposed further forwards than the lens-mounting part 2100 of the first body 500 in the optical-axis direction.

Accordingly, hereinafter, content related to the first body 500 and the second body 600 will be described in common, except where otherwise noted.

The base 700 may accommodate the first lens group 200 to the third lens group 400, the first body 500, and the second body 600, and as described above, the first lens group 200 may be securely mounted to the mounting portion provided in the base 700.

The camera module according to the embodiment may further include a printed circuit board 1400 coupled to the bottom surface of the base 700. The printed circuit board 1400 may be electrically connected to a moving coil 3220 and a position sensor 4200 to supply the current required in order to drive the camera module. In addition, the printed circuit board 1400 may be provided with a controller (not illustrated), or may be electrically connected to a separately provided controller.

The printed circuit board 1400 may include a portion to which the position sensor 4200 is coupled. In an embodiment, the position sensor 4200 may be disposed in the internal space in the base 700. To this end, referring to FIG. 4, a hole may be formed in the printed circuit board 1400, and the printed circuit board 1400 may include a bent portion 1410. The bent portion 1410 may be disposed in the internal space in the base 700 through the hole.

The position sensor 4200 may be coupled to the bent portion 1410, which is disposed in the internal space in the base 700, of the printed circuit board 1400 and thus may be disposed in the internal space in the base 700.

Hereinafter, the rod 800 and the rolling part 900 will be described in detail with reference to FIGS. 2, 3, and 7 to 9. FIG. 7 is a perspective view of FIG. 4, from which some components are removed. FIG. 8 is a perspective view illustrating some components of a camera module according to an embodiment. FIG. 9 is a perspective view illustrating a first body 500 according to an embodiment.

The rod 800 may be disposed such that the longitudinal direction thereof is oriented in the optical-axis direction, and may be in sliding contact with the first body 500 and the second body 600 so as to guide the movement of the first body 500 and the second body 600.

As the first body 500 and the second body 600 move in the optical-axis direction, the second lens group 300 and the third lens group 400 coupled thereto may also move in the optical-axis direction.

Since the structures of the first body 500 and the second lens group 300 and the structures of the second body 600 and the third lens group 400 are similar, the first body 500 and the second body 600 will be collectively referred to as a body, and the second lens group 300 and the third lens group 400 will be collectively referred to as a moving lens group 300 or 400 hereinafter.

The rod 800 may be secured to the camera module, and the moving lens group 300 or 400 may be moved linearly in the optical-axis direction relative to the rod 800 by the body. Accordingly, when the body provided in the moving lens group 300 or 400 moves in the optical-axis direction, the body and the rod 800 may be in sliding contact with each other.

Meanwhile, the rod 800 may be disposed such that the longitudinal direction thereof is oriented in the optical-axis direction, and may guide the linear movement of the body and the moving lens group 300 or 400 in the optical-axis direction, thereby preventing the moving lens group 300 or 400 from moving in an unintended direction.

The rod 800 may be securely mounted to the base 700. In order to secure the rod 800 to the base 700, the base 700 may include recesses formed therein to receive opposite ends of the rod 800.

The recesses may be formed in the front portion and the rear portion of the base 700 in the optical-axis direction, and opposite end portions of the rod 800 may be securely fitted into the recesses in an interference-fit manner or using an adhesive.

The rod 800 may be provided in a pair, and the pair of rods 800 may be spaced apart from each other in a direction perpendicular to the optical-axis direction. In an embodiment, two rods 800 may be provided in order to respectively guide the first body 500 and the second body 600. The two rods 800 may be spaced apart from each other in a direction perpendicular to the optical-axis direction, and may be arranged parallel to each other.

Since the two rods 800 are securely fitted into the recesses formed in the base 700, it is possible to maintain a constant spacing distance therebetween in a direction perpendicular to the optical-axis direction.

Referring to FIGS. 8 and 9, the lens-mounting part 2100 may include a guide groove 2110 in which the rod 800 is seated so that the guide groove 2110 is in sliding contact with the rod 800. Of course, the guide groove 2110 may be formed in each of the lens-mounting parts 2100 respectively provided in the first body 500 and the second body 600.

Therefore, the body may be guided by the guide groove 2110 to move in the optical-axis direction while maintaining sliding contact with the rod 800.

The body may be guided by the rod 800 to move linearly in the optical-axis direction, and separate rotational movement of the body and the rod 800 may not occur.

In the embodiment, since the body is provided so as to move in the optical-axis direction through sliding contact between the rod 800 and the body, a camera module capable of efficiently performing the auto-focusing and zoom-up functions and having a simple structure may be realized.

Next, the rolling part 900 will be described in detail with reference to FIGS. 2, 3, and 7 to 9. The rolling part 900 may be disposed in the first body 500 and the second body 600, and may be in rolling contact with the rod 800 and the base 700.

One or two or more rolling parts 900 may be provided. For example, one rolling part 900 may be provided in a hole formed in the frame 2200 of the first body 500, or a plurality of rolling parts 900 may be respectively disposed in a plurality of holes formed in the frame 2200. In addition, one rolling part 900 may be provided in a hole formed in the frame 2200 of the second body 600, or a plurality of rolling parts 900 may be respectively disposed in a plurality of holes formed in the frame 2200.

Since the first body 500 and the second body 600 have a similar structure, the first body 500 and the second body 600 will be collectively referred to as a body hereinafter.

The rolling part 900 may be implemented as a wheel or a roller, and may be mounted to the frame 2200. The wheel or the roller may be provided with a rotating shaft protruding so as to be coupled to the frame 2200, and thus may be mounted to the frame 2200. The rotating shaft may be rotatably coupled to the frame 2200. The rolling part 900 may include a first wheel 910 and a second wheel 920. One of the first wheel 910 and the second wheel 920 may be omitted.

The first wheel 910 may be mounted to the upper portion of the frame 2200, and may roll on the rod 800. Further, the rod 800 may be in sliding contact with the guide groove 2110 in the lens-mounting part 2100.

The second wheel 920 may be disposed in the frame 2200, and may roll on the base 700. Accordingly, when the body moves in the optical-axis direction, the generation of friction between the body and the base 700 may be greatly reduced compared with the case in which the body is in sliding contact with the base 700.

Meanwhile, referring to FIGS. 2 and 3, the first wheel 910 and the second wheel 920 may be spaced apart from each other. That is, the first wheel 910 and the second wheel 920 may be disposed such that the outer circumferential surfaces thereof are spaced apart from each other in the upward-downward direction so as to avoid contact therebetween.

Referring to FIG. 3, a groove may be concavely formed in at least a portion of the outer circumferential surface of the first wheel 910, and a portion of the second wheel 920 may be disposed in the groove in order for the first wheel 910 and the second wheel 920 not to contact each other. Alternatively, the second wheel 920 may be disposed in the groove in the first wheel 910 in order for the first wheel 910 and the second wheel 920 to contact each other and to roll together.

Meanwhile, the concave portion in the first wheel 910 may be used as a space in which the rod 800 is disposed.

With the above structure, whereby contact between the first wheel 910 and the second wheel 920 is avoided, the generation of unnecessary friction attributable to contact between the first wheel 910 and the second wheel 920 may be prevented, smooth rotation of the first wheel 910 and the second wheel 920 may be secured, and the movement of the first wheel 910 and the movement of the second wheel 920 may be synchronized due to contact therebetween.

In the embodiment, since the rolling part 900 rolls relative to the rod 800 and the base 700, the generation of friction between the body and the rod 800 and between the body and the base 700 may be greatly reduced during movement of the body.

When the rolling part 900 is not provided in the camera module, sliding contact occurs between the body and the rod 800 and between the body and the base 700 during movement of the body, and thus a very large amount of friction may be generated compared with rolling contact.

When a large amount of friction is generated due to sliding contact, the amount of current consumed in order to move the body may increase, and a tilting phenomenon may occur in which the body moves in a direction other than the direction parallel to the optical-axis direction due to the large amount of friction, thus making it difficult to ensure accurate movement of the body.

Therefore, in the embodiment, the movement of the body in the optical-axis direction may be stably supported by the rolling part 900 by which the rolling contact occurs. Thus, compared with sliding contact, the amount of current consumed in order to move the body may be reduced, and the occurrence of tilting may be effectively reduced.

The body may be supported by the rolling part 900, and may be supported and guided by the rod 800. Thereby, the body may move linearly in the optical-axis direction without the occurrence of separate rotational movement thereof.

In the embodiment, since the body is capable of moving in the optical-axis direction owing to sliding contact between the rod 800 and the body and rolling contact between the rolling part 900 and the body, a camera module capable of efficiently performing the auto-focusing and zoom-up functions and having a simple structure may be realized.

Hereinafter, a driving device for moving the first body 500 and the second body 600 in the optical-axis direction will be described in detail with reference to FIGS. 3 to 7.

The driving device for moving the body in the optical-axis direction may include a driving magnet 3100 and a coil part 3200. The driving magnet 3100 may be mounted to the frame 3200 of each of the first body 500 and the second body 600, and the coil part 3200 may be coupled to the base 700, and may be disposed opposite the driving magnet 3100.

For example, referring to FIG. 7, the driving magnet 3100 may be coupled to the frame 2200 of the body. Specifically, the driving magnet 3100 may be disposed between a pair of rolling parts 900 provided in the optical-axis direction in the frame 2200. The driving magnet 3100 may be secured to the frame 2200 using an adhesive.

Since the moving distances in the optical-axis direction or the moving directions of the first body 500 and the second body 600 are independently controlled, the driving magnet 3100 and the coil part 3200 may separately be provided at positions corresponding to each of the first body 500 and the second body 600.

Accordingly, referring to FIG. 7, two driving magnets 3100 for driving the first body 500 and the second body 600 may be disposed so as to be spaced apart from each other in a direction perpendicular to the optical-axis direction.

Further, similar to the two driving magnets 3100, two coil parts 3200, which are respectively disposed opposite the two driving magnets 3100 to generate electromagnetic interaction therewith, may be disposed so as to be spaced apart from each other in a direction perpendicular to the optical-axis direction.

The driving magnet 3100 may be coupled to the body. It is preferable for the driving magnet 3100 to be disposed further outwards than the body in a direction perpendicular to the optical-axis direction so as to be located at a position close to the coil part 3200.

The driving magnet 3100 may be configured as a permanent magnet. Only one driving magnet 3100 may be provided. However, in another embodiment, the driving magnet 3100 may be configured as a plurality of permanent magnets stacked in a direction perpendicular to the optical-axis direction.

The coil part 3200 may be coupled to the base 700, and may be disposed opposite the driving magnet 3100. Meanwhile, the coil part 3200 and the driving magnet 3100, which are disposed opposite each other, may be spaced apart from each other.

The coil part 3200 may be disposed in a space formed in a side portion of the base 700, and may include a yoke 3210 and a moving coil 3220.

The yoke 3210 may be mounted to the base 700, and may be disposed such that the longitudinal direction thereof is oriented in the optical-axis direction. The moving coil 3220 may be wound on the yoke 3210, and a part thereof may be disposed opposite the driving magnet 3100. Since the longitudinal direction of the moving coil 3220 wound on the yoke 3210 is oriented in the optical-axis direction, a part of the moving coil 3220 in the longitudinal direction may have a linear shape.

In order to couple the coil part 3200 to the base 700, for example, opposite ends of the yoke 3210 may be secured to the base 700. In another embodiment, the yoke 3210 and the moving coil 3220 may be bonded and fixed to the base 700 using an adhesive filler.

Opposite ends of the moving coil 3220 may be electrically connected to the printed circuit board 1400, and thus the moving coil 3220 may receive current from an external power source (not illustrated).

When current is applied to the moving coil 3220, an electromagnetic interaction may occur between the moving coil 3220 and the driving magnet 3100, and the body, to which the driving magnet 3100 is coupled, may move in the optical-axis direction, depending on the direction in which the current is applied, according to Fleming's left-hand rule.

It is possible to adjust the moving direction of the body in the optical-axis direction, i.e. whether to move the body toward the first lens group 200 or to move the body in the opposite direction by adjusting the direction in which the current is applied to the moving coil 3220. Further, it is also possible to adjust the moving distance of the body in the optical-axis direction by adjusting the time period during which the current is applied to the moving coil 3220.

As described above, the moving direction and the moving distance of the body may be adjusted through interaction between the moving coil 3220 and the driving magnet 3100, whereby the camera module is capable of performing the zoom-up function.

As described above, in the embodiment, the third lens group 400 and the second lens group 300 may be sequentially provided behind the first lens group 200, and the moving directions and the moving distances of the second lens group 300 and the third lens group 400 may be independently adjusted by the first body 500 and the second body 600. Thus, the camera module according to the embodiment is capable of efficiently and accurately performing the zoom-up function.

Hereinafter, a structure for detecting the moving positions of the first body 500 and the second body 600 in the optical-axis direction will be described in detail with reference to FIGS. 3 to 7.

Referring to FIGS. 3 to 7, the device for detecting the moving position of the body in the optical-axis direction may include a sensing magnet 4100 and a position sensor 4200.

The sensing magnet 4100 may be provided in a pair, and the pair of sensing magnets 4100 may be coupled to the respective ends of the frame 2200, and may be spaced apart from each other in the optical-axis direction. The position sensor 4200 may be provided in a pair, and the pair of position sensors 4200 may be disposed opposite the sensing magnets 4100, and may be spaced apart from each other in the optical-axis direction. At least two sensing magnets may be provided in order to secure sensing linearity. That is, the sensing magnets may be disposed such that, when one thereof moves away from a corresponding position sensor, the other one thereof comes close to a corresponding position sensor. For example, the sensing magnets may be respectively disposed at one end portion and the opposite end portion of the body, and the position sensors may be disposed at positions corresponding to the sensing magnets, thereby securing linearity. The driving magnet may be disposed between the two sensing magnets.

Therefore, referring to FIG. 6, the pair of sensing magnets 4100 and the pair of position sensors 4200 may be disposed so as to be spaced apart from each other in the optical-axis direction with respect to one frame 2200.

Referring to FIG. 6, since the moving distances in the optical-axis direction and the moving directions of the first body 500 and the second body 600 are independently controlled, four sensing magnets 4100 may be provided such that two thereof are respectively disposed at opposite ends of one of the two frames 2200 arranged parallel to each other and two thereof are respectively disposed at opposite ends of the other frame, and four position sensors 4200 may be provided corresponding thereto.

The four sensing magnets 4100 may be spaced apart from each other in the optical-axis direction and in a direction perpendicular to the optical-axis direction. Similarly, the four position sensors 4200, which are disposed opposite the sensing magnets 4100, may also be spaced apart from each other in the optical-axis direction and in a direction perpendicular to the optical-axis direction.

Since two sensing magnets 4100 and two position sensors 4200 are provided at each of the frames 2200 in the optical-axis direction, the camera module is capable of more accurately detecting the moving position and the moving direction of the body compared with a case in which one sensing magnet 4100 and one position sensor 4200 are provided at each frame in the optical-axis direction.

Meanwhile, the sensing magnet 4100 and the position sensor 4200 may be disposed opposite each other. Meanwhile, the sensing magnet 4100 may be disposed at each of opposite ends of the frame 2200, and the position sensor 4200 may be coupled to the printed circuit board 1400.

Therefore, in order to allow the sensing magnet 4100 and the position sensor 4200 to be opposite each other in the optical-axis direction, as illustrated in FIGS. 5 and 6, a bent portion 1410 may be formed at a portion of the printed circuit board 1400 so as to be bent in a direction perpendicular to the optical-axis direction, and the position sensor 4200 may be disposed at the bent portion 1410.

Meanwhile, in order to avoid magnetic interference with the driving magnet 3100, the sensing magnet 4100 may need to be spaced apart from the driving magnet 3100.

Accordingly, as illustrated in FIGS. 5 and 6, the driving magnet 3100 may be disposed at the center portion of the frame 2200, and the sensing magnet 4100 may be disposed at each of opposite ends of the frame 2200, whereby the driving magnet 3100 and the sensing magnet 4100 may be spaced apart from each other in the optical-axis direction and in a direction perpendicular to the optical-axis direction.

Meanwhile, the position sensor 4200 may malfunction due to the current applied to the coil part 3200, and it is therefore preferable for the position sensor 4200 and the coil part 3200 to be spaced apart from each other.

Therefore, referring to FIG. 6, when viewed in the optical-axis direction, the position sensor 4200 may be located at each of the positions in front of and behind the moving coil 3220 of the coil part 3200, and the coil part 3200 and the position sensor 4200 may be spaced apart from each other in the optical-axis direction.

As described above, although the sensing magnets 4100 and the position sensors 4200, which are provided in four pairs in relation to the first body 500 and the second body 600, are disposed at different positions, they have similar structures and perform similar functions, and thus will be described collectively.

The sensing magnet 4100 may be securely coupled to the body, and thus, when the body moves, the sensing magnet 4100 may move together therewith in the optical-axis direction. The sensing magnet 4100 may be configured as a permanent magnet, and may be provided in a singular number. However, the sensing magnet 4100 may be formed in a structure in which a plurality of magnets is stacked.

The position sensor 4200 may be coupled to the printed circuit board 1400, and may be disposed opposite the sensing magnet 4100. The position sensor 4200 may be configured to sense a change in the magnetic force of the sensing magnet 4100, and may be configured as, for example, a hall sensor.

The printed circuit board 1400 may be coupled to the bottom surface of the base 700, and the position sensor 4200 may be disposed so as to be coupled to the bent portion 1410 that faces the sensing magnet 4100. The printed circuit board 1400 may be electrically connected to the position sensor 4200 to apply the current supplied from an external power source to the position sensor 4200.

The signal transmitted from the position sensor 4200 may be transmitted to a controller, which is provided on the printed circuit board 1400 or is connected to the printed circuit board 1400, through the printed circuit board 1400.

When the sensing magnet 4100 moves together with the body, the magnetic field of the sensing magnet 4100 changes. The detection sensor, which is securely disposed at a position opposite the sensing magnet 4100, may sense the change in the magnetic field of the sensing magnet 4100, thereby detecting information about the movement of the body, such as the moving direction or moving speed of the body.

The information about the movement of the body detected by the position sensor 4200 may be transmitted to the controller, and the controller may perform feedback control of the moving direction, moving speed, and moving position of the body based on the information about the movement.

The camera module is capable of efficiently and accurately performing the zoom-up function through the feedback control of the body by the controller.

FIG. 10 is a perspective view illustrating the base 700 according to an embodiment. FIG. 11 is a plan view of FIG. 10. A guide groove 710 may be formed in the base 700.

The guide groove 710 may be formed in the bottom surface of the base 700 such that the longitudinal direction thereof is oriented in the optical-axis direction, may be in rolling contact with the second wheel 920 to guide the movement of the second wheel 920 in the optical-axis direction, and may include convex rails 711 and a concave rail 712.

The concave rail 712 may be in rolling contact with the outer circumferential surface of the second wheel 920. Thus, the body may move in the optical-axis direction through rolling contact with the base 700 due to the concave rail 712.

The convex rails 711 may be formed on both sides of the concave rail 712 so as to protrude, and thus the second wheel 920 may be guided by the convex rails 711 to move in the optical-axis direction. The convex rails 711 may effectively prevent the second wheel 920 from excessively moving in a direction other than the optical-axis direction.

Meanwhile, it is preferable that the width of the outer circumferential surface of the second wheel 920 be smaller than the width of the concave rail 712. This is for preventing the generation of unnecessary friction, which may be caused by contact between the side surfaces of the second wheel 920 and the side surfaces of the convex rails 711 when the width of the outer circumferential surface of the second wheel 920 and the width of the concave rail 712 are similar to each other.

A lens assembly may be composed of a mover and a fixed part. The mover may be a part that is moved by rolling movement of the wheel. For example, the mover may include the first lens group, the first body, the first wheel, and the first driving magnet. The base, on which the wheel moves, and parts fixed thereto may be referred to as a fixed part. For example, the fixed part may include the base, the rod, and the position sensor.

Although only a limited number of embodiments have been described above, various other embodiments are possible. The technical contents of the above-described embodiments may be combined into various forms as long as they are not incompatible with one another, and thus may be implemented in new embodiments.

INDUSTRIAL APPLICABILITY

A camera module including a liquid lens according to embodiments may be used in mobile devices and elsewhere.

The invention claimed is:

1. A lens assembly, comprising:
a base;
a first lens group disposed in the base;
a first body coupled to the first lens group;
a first wheel rotatably coupled to the first body, the first wheel being configured to move the first lens group on the base; and
a second wheel coupled to the first body, the second wheel being configured to move the first body in an optical-axis direction,
wherein the first wheel and the second wheel are in contact with each other to roll, and
wherein the second wheel comprises a groove formed therein to allow a portion of the first wheel to be disposed therein.

2. The lens assembly according to claim 1, wherein the first body comprises a first hole formed therein to allow the first wheel to be disposed therein.

3. The lens assembly according to claim 1, comprising:
a first magnet disposed in the first body; and
a first coil part disposed in the base so as to be opposite the first magnet.

4. The lens assembly according to claim 3, wherein the first coil part comprises:
a yoke disposed in the base such that a long side thereof is parallel to the optical-axis direction; and
a coil wound on the yoke and disposed opposite the first magnet.

5. The lens assembly according to claim 3, comprising:
a first sensing magnet and a second sensing magnet disposed in the first body, with the first magnet interposed therebetween; and
a first position sensor disposed at a position corresponding to the first sensing magnet and a second position sensor disposed at a position corresponding to the second sensing magnet on the base.

6. The lens assembly according to claim 1, further comprising a first rod disposed in the base along the optical-axis direction.

7. A lens assembly, comprising:
a base;
a first lens group disposed in the base;
a first mover coupled to the first lens group, the first mover being configured to move the first lens group; and
a rod disposed in the base,
wherein the first mover comprises a first wheel and a second wheel, the first wheel and the second wheel being configured to move the first lens group along the rod,
wherein the first wheel and the second wheel are in contact with each other to roll, and
wherein the second wheel comprises a groove formed therein to allow a portion of the first wheel to be disposed therein.

8. A camera module, comprising:
a base;
a first lens group disposed in the base;
a second lens group spaced apart from the first lens group in an optical-axis direction;
a third lens group disposed between the first lens group and the second lens group;
a first wheel configured to move the second lens group in the optical-axis direction on the base; and
a second wheel configured to move the third lens group in the optical-axis direction on the base.

9. The camera module according to claim 8, further comprising:
a first body coupled to the second lens group; and
a second body coupled to the third lens group,
wherein each of the first and second bodies comprises:
a lens-mounting part to which a corresponding lens group among the second and third lens groups is mounted; and
a frame disposed such that a longitudinal direction thereof is oriented in the optical-axis direction, the first and second wheels being mounted to the frame.

10. The camera module according to claim 9, further comprising a rod disposed such that a longitudinal direction thereof is oriented in the optical-axis direction, the rod being in sliding contact with the first body and the second body so as to guide movements of the first body and the second body.

11. The camera module according to claim 10, wherein each of the first and second bodies is supported by the first and second wheels and is supported and guided by the rod such that each of the first and second bodies is configured to linearly move in the optical-axis direction.

12. The camera module according to claim 10, wherein the first wheel and the second wheel are disposed in the first body and the second body, respectively, and are in rolling contact with the rod and the base.

13. The camera module according to claim 12, wherein the first wheel is mounted to an upper portion of the frame and configured to roll on the rod, and
wherein the second wheel is disposed in the frame and configured to roll on the base.

14. The camera module according to claim 10, wherein the lens-mounting part includes a guide groove in which the rod is seated such that the guide groove is in sliding contact with the rod.

15. The camera module according to claim 14, wherein the guide groove comprises:
a concave rail being in rolling contact with an outer circumferential surface of the second wheel; and convex rails formed on both sides of the concave rail so as to protrude, the convex rails being configured to guide a movement of the second wheel in the optical-axis direction.

16. The camera module according to claim 15, wherein a width of an outer circumferential surface of the second wheel is smaller than a width of the concave rail.

17. The lens assembly according to claim 5, wherein the first sensing magnet and the second sensing magnet are spaced apart from the first magnet and disposed respectively disposed at opposite ends of the first body, and wherein the first sensing magnet and the second sensing magnet are disposed such that, when the first position sensor moves away from the first sensing magnet, the second position sensor comes close to the second sensing magnet.

18. The lens assembly according to claim 5, wherein the first and second position sensors and the first coil part are disposed so as to be spaced apart from each other in the optical-axis direction.

19. The lens assembly according to claim 1, wherein the base comprises a recess formed therein to receive a portion of the first wheel and to guide the first wheel.

* * * * *